Aug. 1, 1944.    R. C. JONES ET AL    2,354,684
SIREN
Filed Aug. 20, 1942    2 Sheets-Sheet 1

INVENTORS: R.C. JONES
H.T. O'NEIL
E.C. WENTE

BY
ATTORNEY

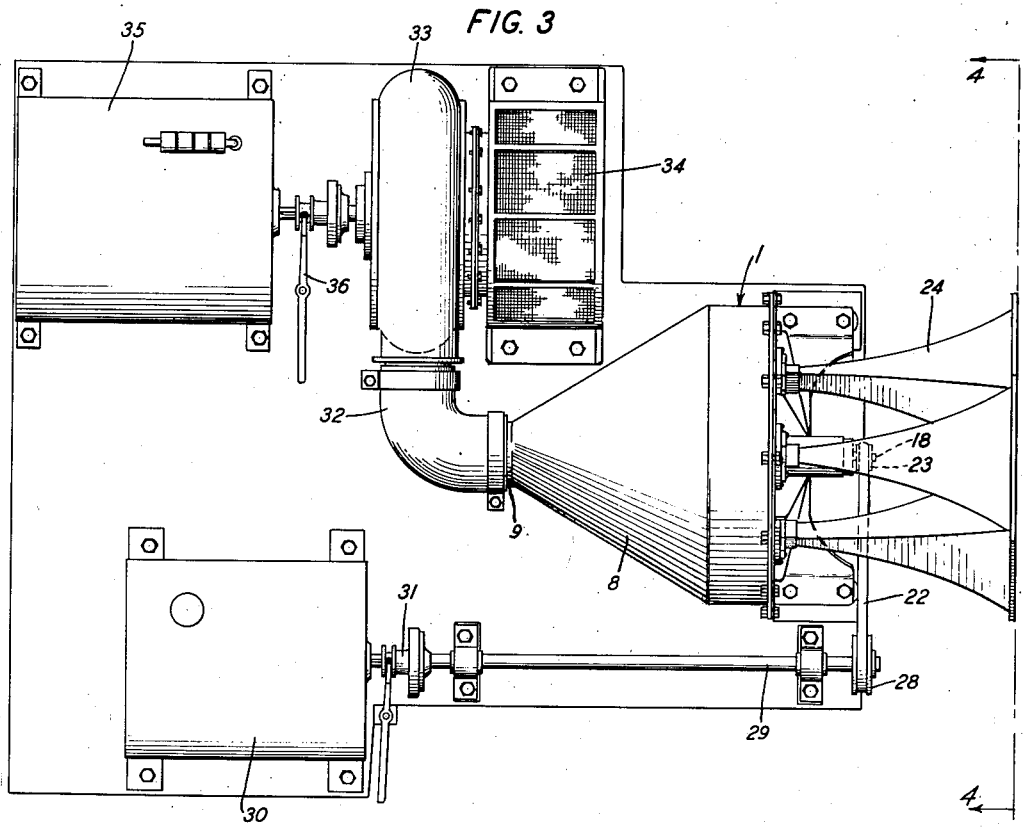
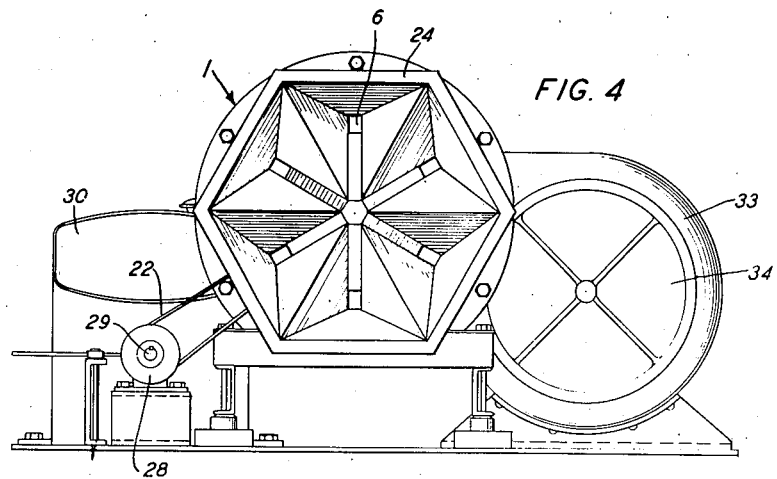

Patented Aug. 1, 1944

2,354,684

UNITED STATES PATENT OFFICE 2,354,684

SIREN

Robert C. Jones, Summit, N. J., Horace T. O'Neil, San Diego, Calif., and Edward C. Wente, Summit, N. J., assignors to Bell Telephone Laboratories, Incorporated, New York, N. Y., a corporation of New York Application August 20, 1942, Serial No. 455,522

19 Claims. (Cl. 116—147)

This invention relates to signaling apparatus, and more particularly to sirens of the type in which the signal is produced by expelling a fluid under pressure through apertures in a stator which are alternately opened and closed by apertures in a rotating rotor.

For the purposes of convenience and illustration, the invention will be discussed hereinafter in connection with sirens employing air as the driving fluid, although it is apparent that the invention may be employed in connection with sirens employing other driving fluids for producing signals.

Sirens of the type in which air is expelled through apertures in a stator which are alternately opened and closed by apertures in a rotating rotor generate sound because the puffs of expelled air form at the outlets of the stator apertures linear compressions and rarefactions in the air constituting sound waves.

Sirens of this type have heretofore been characterized by a relatively low efficiency. That is, the power represented by the sound produced has been relatively small compared to the power represented by the available energy of the air supplied to the siren, and also small compared to the power required to drive the siren and supply it with air. The inefficiency of such prior sirens is largely caused by dissipation of the available energy of the air by turbulence in and impedance of the air flowing to and through the stator apertures and leaving said stator apertures. Such turbulence and impedance reduce the portion of the energy of the air available for the production of sound waves.

In prior sirens turbulence in the air caused by expansion of the air beyond abrupt edges as it passes through and discharges from the stator apertures causes the largest loss of available energy and efficiency. In general, in such sirens each stator aperture is formed with a sharp or abrupt discharge edge in a plane surface of substantial area about the aperture. Under such conditions the air expelled under pressure through the aperture expands abruptly and becomes turbulent when it reaches the abrupt discharge edge of the aperture. Such turbulence dissipates a large portion of the energy of the air which would otherwise be available for the production of sound waves.

Turbulence also occurs for a similar reason as the air expands past the discharge edge of the rotor as it moves across the stator aperture. In most, if not all, prior sirens the time during which an edge of a rotor aperture moves across and partially obstructs the stator aperture, which occurs during opening and closing of the stator aperture, is considerably greater than the time during which the stator aperture is entirely open and entirely closed, this because the stator apertures and rotor apertures are of substantially equal sizes. Hence, the turbulence caused by air expanding past the sharp edge of the rotor aperture, as well as other turbulence caused by throttling of the air through the partially obstructed stator aperture, with the consequent dissipation of energy, occurs for a large proportion of the time of operation of prior sirens, with a consequent loss of efficiency.

The prior sirens in which each stator aperture is only partially open for a relatively long time as compared with the time that it is fully open and fully closed are also inherently inefficient because only when it is fully open and fully closed does a stator aperture most effectively produce the compressions and rarefactions constituting the sound waves. The stator aperture is much less effective in producing sound waves when it is only partially open, as occurs when it is being opened and closed by the rotor aperture.

Impedance of the flow of air in prior sirens is caused by obstructions to the flow of air to, through, and from the stator apertures, by partial obstruction of the stator apertures for substantial periods by the rotor apertures, by tortuous air paths, and by other factors, all of which cause a loss of available energy of the air and hence a loss in efficiency of the siren.

The present invention has for its primary object the provision of a siren of the type in which the signal is produced by expelling air under pressure through apertures in a stator which are alternately opened and closed by apertures in a rotating rotor of an efficiency much greater than heretofore possible in prior devices of this type. Another object is to reduce the losses in the available energy of the air because of turbulence in and impedance of the air flow. These and other objects of the invention and the means by which they are achieved will be apparent from the following discussion of the invention.

In a siren embodying the present invention each stator aperture, which is unobstructed in the sense that it is of the type through which air passes to generate the sound, has associated therewith at its outlet end an individual acoustic horn the throat of which is of substantially the same size and shape as the outlet end of the aperture so that the horn, in effect, constitutes a continuation of the aperture. Therefore, the outlet end of the aperture has no abrupt edge which can cause substantial turbulence and dissipation of the energy of the air in the manner indicated above. Moreover, since the horn is one which substantially matches the impedance at the outlet end of the stator aperture to the impedance of the approximately plane wave of the sound produced, it makes possible a highly efficient utilization of the available energy of the sound waves produced, and thus adds materially to the efficiency of the siren. The horn advantageously is of the exponential type having a cut-off frequency lower than the frequency of the sound produced by the siren, since for the same effects an exponential horn is shorter than horns of other types. The combination of an acoustic horn with an unobstructed stator aperture according to the invention provides a great increase in siren efficiency.

According to the invention, moreover, each stator aperture and each rotor aperture are advantageously so shaped and related that, as the rotor rotates at a substantially uniform speed, the stator aperture is entirely open for a substantial period and entirely closed for a substantial period, so that the time constituting the period during which the stator aperture is entirely open and entirely closed is substantial as compared to, and advantageously substantially longer than, the time during which the stator aperture is only partially open constituting the period during which the stator aperture is being opened and the period during which the stator aperture is being closed. Under such conditions the length of time during which turbulence can occur at the edge of the rotor aperture due to expansion of the air and due to throttling is reduced as compared with the length of time during which such turbulence is absent, with a consequent increase in efficiency over prior sirens for this reason. Moreover, the length of time during which the stator aperture operates most effectively to produce sound waves, i. e., when it is fully opened and fully closed, is thus increased as compared with the length of time when it is less effective in producing sound waves, i. e., when it is being opened and when it is being closed, which also increases the efficiency of the aperture in producing sound waves.

The combination of a stator aperture of the above design with a horn having a throat matched to the stator aperture as indicated above makes possible the reduction to the greatest possible extent of the turbulence of the air passing through the stator aperture and thus makes possible the maximum efficiency of the aperture.

According to the present invention, moreover, the air may be supplied to the stator apertures by, and the rotor may be disposed in, an air reservoir of such large volume and so shaped that each aperture has a small radiation resistance into the reservoir so that little of the available energy in the air supplied to such stator aperture can be dissipated in the production of sound waves at the inlet side of the stator aperture where they are ineffective. Advantageously the reservoir takes the form of a closed chamber having in a wall thereof the stator apertures each of which is connected as indicated above with an individual horn outside of said chamber, which chamber contains therein a rotor having a portion thereof which is mounted in close proximity to the stator apertures and which has rotor apertures which are related to the stator apertures in the manner indicated above.

Although sirens embodying features of the invention may be constructed with only one stator aperture and/or only one rotor aperture, the most desirable results are provided when the stator and the rotor each is provided with a plurality of apertures. The desired sound frequency is thus obtained without the employment of an excessively high speed of rotation of the rotor which, besides involving mechanical difficulties, would also cause considerable air turbulence and a corresponding loss of efficiency. Both the stator apertures and the rotor apertures advantageously are equally angularly spaced around the axis of rotation of the rotor to cause as nearly as possible the formation of harmonic-free sound waves of a single frequency and maximum intensity. For simplicity in construction, as well as for achieving a maximum loudness of sound for a given size of siren unit, it is also advantageous that the number of apertures in the rotor correspond to the number in the stator, that the rotor aperture widths and the spacing between said apertures be substantially equal, that the stator apertures be all equal in size and area, and that the rotor apertures be all equal in size and area. With such a design a plurality of identical sound waves, one from each stator aperture, is produced.

In order that the time constituting the period during which the stator aperture is fully open and the period during which it is entirely closed be substantial as compared to the time constituting the period during which each stator aperture is being opened and the period during which it is being closed, as the rotor rotates at a uniform speed, the rotor apertures are formed so that each is substantially wider than each of the stator apertures in the direction of movement of the rotor with respect to the stator, and adjacent rotor apertures are spaced in the direction of movement of said rotor with respect to said stator by a distance substantially greater than the width of each of said stator apertures. The width and spacing of the rotor apertures as compared with the width of the stator apertures should be as large as constructional limitations permit. Advantageously each of the rotor apertures is at least twice as wide as each of the stator apertures and adjacent rotor apertures are spaced by a distance at least twice the width of said stator apertures; in such case the time during which the stator aperture is entirely open and the time during which it is entirely closed each is at least equal to the time during which said stator aperture is being opened and at least equal to the time during which said stator aperture is being closed. Particular advantages are provided when the width of each of the rotor apertures and the distance between the rotor apertures each is at least four times the width of each stator aperture; in such case the time during which the stator aperture is entirely open and the time during which it is entirely closed each is at least three times as long as the time during which said stator aperture is being opened and at least three times as long as the time during which said stator aperture is being closed.

While various shapes of rotor and stator apertures may be employed in sirens embodying the present invention, particular advantages are provided if the stator and rotor apertures are so shaped that they cooperate to open and close as abruptly as possible the stator apertures since turbulence of the air passing through the stator apertures due to throttling and other causes is thus reduced to a minimum. To obtain such an efficient mode of operation, the apertures in both the stator and rotor are formed so that they have edges extending transversely of the direction of movement of the rotor with respect to the stator which are substantially straight and are so directed that said edges of each rotor aperture cooperate with said edges of each stator aperture to open and close abruptly said stator aperture. It is most advantageous for abrupt opening and closing that such straight edges extend substantially at right angles to the direction of motion of the rotor with respect to the stator so that said edges lie substantially in a plane including the axis of rotation of the rotor; that is, if the apertures are disposed in the peripheries of the stator and rotor, said straight edges advantageously should extend substantially parallel to the axis of rotation of the rotor, while if the apertures are disposed in portions of the rotor and stator extending transversely of the axis of rotation of the rotor, said straight edges advantageously should extend substantially radially of said axis of rotation.

In order to minimize the possibility of leakage of the air employed as the driving fluid past the rotor when the stator apertures are closed, the rotor is disposed in close proximity to the stator: that is, the rotor fits very closely against the stator aperture edges while the stator aperture is closed by the rotor. For highest efficiency of a siren of a given power input it is advantageous that the total area of the stator apertures be as large as practicable, that is, large for the size of the siren unit, since this makes possible the use of a relatively low air pressure which reduces the tendency toward air turbulence and reduces air leakage losses.

While the features of the present invention may be applied to sirens of various types, a siren of the type in which the rotor apertures and stator apertures are contained in portions of the rotor and stator extending transversely, and particularly substantially radially, of the axis of rotation of the rotor provides particular advantages when constructed according to the present invention because a straighter, less disturbed flow of air, and hence a lower impedance to the flow of air, to the stator apertures is possible than in other types of sirens. Such a straight, undisturbed relatively unimpeded flow of air is important in achieving high siren efficiency. A siren of this type also is advantageous because the acoustic horns connected to the outlets of the stator apertures may all extend in the same direction, without being bent, to provide maximum directional effects. This makes possible a substantially straight line flow of air through each stator aperture into and through the horn, which is more efficient than if a change in the direction of the air was required.

These and other advantageous features of the invention will be explained more fully hereinafter in connection with the appended drawings, in which:

Fig. 3 is a plan elevation of a siren unit, including the siren of Figs. 1 and 2 and power and air supply sources therefor; and Fig. 4 is a front elevation from line 4—4 of the siren unit of Fig. 3.

Figure 1:
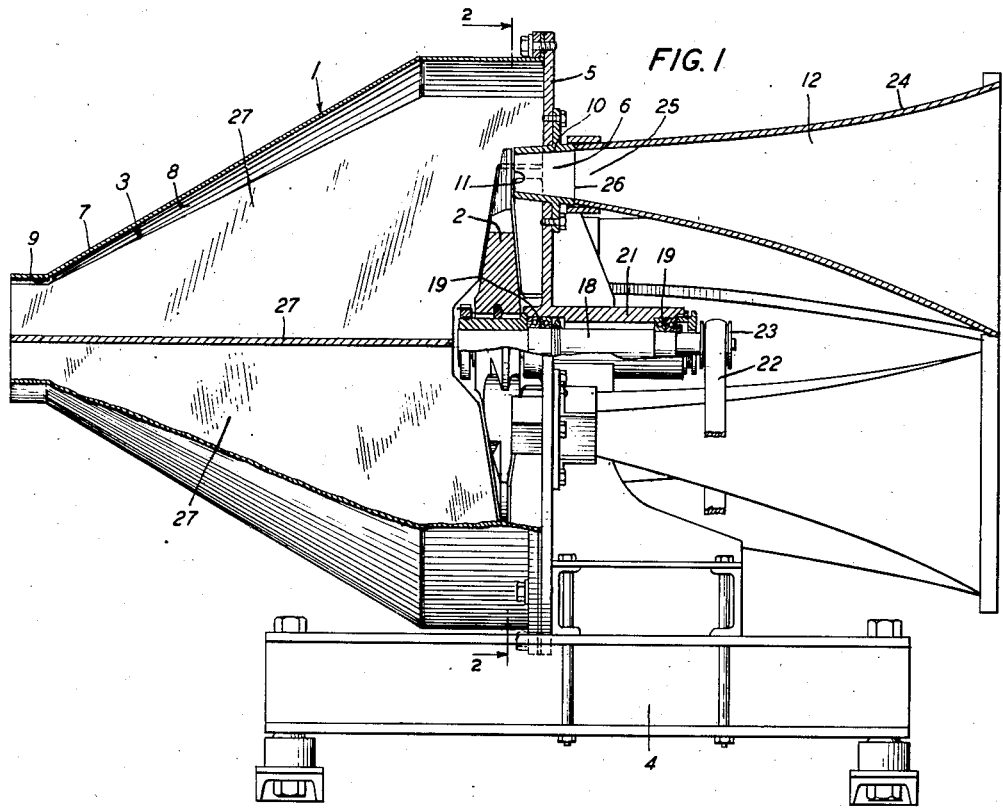
Fig. 1 represents a side elevation of a siren constituting an advantageous embodiment of the present invention, parts being broken away along line 1—1 of Fig. 2 to show more clearly the features of construction.
Figure 2:
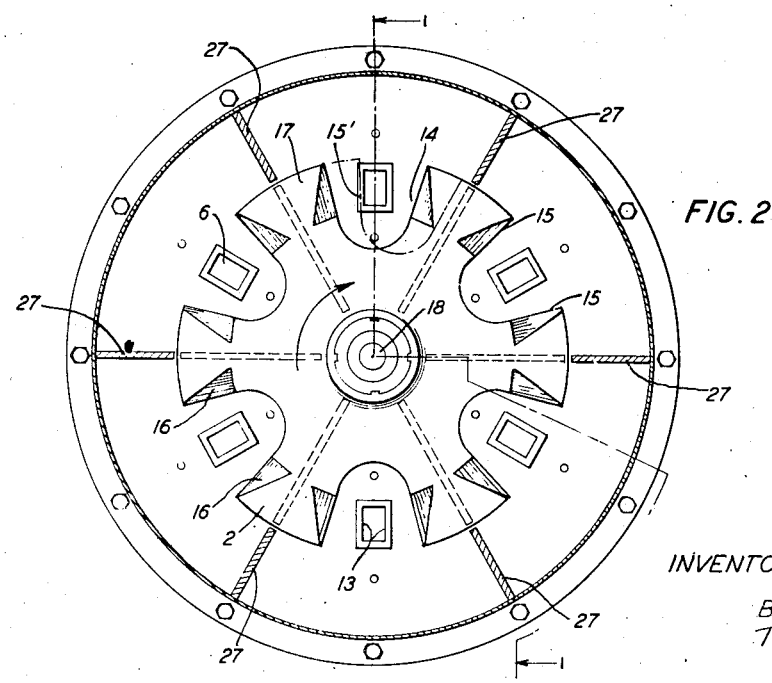
Fig. 2 is a sectional elevation along line 2—2 of Fig. 1.

In the embodiment of the invention illustrated in Figs. 1 and 2, the siren 1 comprises rotor 2 and stator 3 and is fixed to supporting means 4. The stator 3 comprises the radial end wall 5 containing stator apertures 6. A frusto-conical housing 7 is bolted to the end wall 5 of the stator to form a large air chamber 8 to which air is supplied, through a duct 9 at the small end of the chamber, from a suitable source. As is shown in Fig. 2, the illustrated siren has six stator apertures 6, equally angularly disposed about the axis of rotation of the rotor 2, and all equal in size and area. Each is formed in a separate port member 10, the inner end 11 of which projects into the stator chamber 8 beyond the end wall 5 with a surface which is accurately finished to make possible a close fit of only a few thousandths of an inch clearance with the rotor 2, and the outer end of which is adapted to be and is connected to the throat of acoustic horn 12 for each stator aperture. As is also shown in Fig. 2, each of the stator apertures 6 in the illustrated embodiment is substantially rectangular in cross section; the side edges 13 of said aperture thus are disposed substantially radially of the axis of rotation of the rotor.

The illustrated rotor 2 is of generally radial disc-like configuration and is accurately balanced and of sturdy construction to permit rotation at high speeds. It is provided with a plurality of rotor apertures 14, all equal in size and area, equally angularly spaced around the axis of rotation of the rotor and corresponding in number to the stator apertures. The side edges 15 of each of the rotor apertures 14 are straight and extend substantially radially of the axis of rotation of the rotor so that they cooperate, as is shown in broken lines at 15', with the edges 13 of the stator apertures to provide an abrupt opening and closing of the stator apertures. Moreover, in the illustrated embodiment, tapered portions 16 are provided at the edges 15 of the rotor apertures 14 to permit a sharper interruption of the air stream passing through each of the stator apertures 6 and to reduce turbulence.

The width of each of the rotor apertures 14 in the illustrated embodiment is approximately four times the width of each of the stator apertures 6, while the portion 17 of the rotor 2 between the rotor apertures 14 is in width approximately four times the width of the stator apertures 6; therefore, the rotor apertures 14 and the portions 17 therebetween are substantially equal in width and each stator aperture is entirely open for about the same length of time that it is entirely closed. The time during which the stator apertures are being opened and closed is only about a third as long as the time during which the stator apertures are entirely opened and entirely closed. As has been indicated above, these features make possible a higher efficiency of the siren. The efficiency is further increased because the period during which the stator aperture is entirely opened is substantially equal to the period during which it is entirely closed, which results in the production of an efficient wave form.

In the apparatus shown, the rotor 2 is rigidly and non-rotatably mounted upon the drive shaft 18 journaled and accurately located endwise by bearings 19 in hub 21 disposed centrally of endplate 5 of stator 3. The rotor thus can be rotated at the desired speed, usually high, from a suitable power source by means of belt 22 and pulley 23 on drive shaft 18.

The horn 12 shown in combination with each of the stator apertures 6 is an exponential horn having a low frequency cut-off which is low as compared with the fundamental frequency of the siren, although types of horns other than the exponential type might be employed. The six horns for the six stator apertures of the illustrated embodiment have their large ends joined together to form a single horn unit 24, as shown to particular advantage in Fig. 4. This provides a sturdy construction.

As is shown in the drawings, and particularly in Fig. 1 thereof, the throat 25 of each horn directly communicates with the outlet end 26 of the corresponding stator aperture 6, and is substantially equal in size and area to said outlet end 26. Each stator aperture 6 in the illustrated embodiment is flared toward its outlet end so that in effect it forms a continuation of the throat 25 of the associated horn 12; this is particularly advantageous for providing a smooth, non-turbulent flow of air but is not absolutely necessary. It is important that the throat 25 of the horn 6 correspond in size and area substantially to the outlet end 26 of the stator aperture and that the connection of the horn to the stator aperture, the stator aperture, and the throat of the horn be substantially free of abrupt edges or bends which can cause appreciable turbulence of the air emerging from the stator aperture.

The illustrated siren also includes in the air chamber 8 six partitions 27 which are joined together at the center of said chamber 8 and extend radially of said chamber between the stator apertures 6, to the walls of the housing 7, and which extend longitudinally of said chamber 8 from the rear portion thereof to points closely adjacent the rotor 2, as shown in Fig. 1. Said partitions, which in effect subdivide the interior of chamber 8 into six compartments, aid in preventing air turbulence and rotation of the air within said chamber which might reduce the efficiency of the siren. Said partitions may be omitted if desired.

In the siren unit shown in Figs. 3 and 4 the rotor of the siren I is positively rotated at the desired speed by means of belt 22 passing around pulley 23 on rotor drive shaft 18 and around pulley 28 on drive shaft 29 connected to a suitable source of power 30 which may be an internal combustion engine, an electric motor or the like. Suitable clutch means 31 is shown for the purpose of disconnecting the rotor from the source of power or for changing its speed of rotation.

In said unit, moreover, air is applied to duct 9 of the air chamber 8 through duct 32 from a suitable air compressor 33 shown in the illustrated embodiment as a centrifugal air compressor. Element 34 represents an intake air cleaner for said compressor, while 35 represents a source of power for said compressor, such as an internal combustion engine, electric motor, or the like. Clutch means 36 is provided in the illustrated apparatus to permit the air compressor to be disconnected from the source of power.

Since in the illustrated embodiment each stator aperture 6 and each horn throat 25 are so connected that a smooth, non-turbulent flow of air through said aperture and into the horn is provided, there is eliminated the substantial energy loss of prior sirens due to air turbulence caused by expansion of the air past abrupt edges at the outlet of each stator aperture. Moreover, the horn 12 is enabled fully to perform its function of providing a proper matching of the impedance of the stator aperture to the impedance of the sound waves produced. These features provide a large portion of the efficiency of the illustrated siren.

Since, moreover, in the illustrated apparatus the stator apertures and the rotor apertures are shaped, spaced and related as indicated above so that the time during which the stator apertures are entirely open and entirely closed is large as compared with the time during which the stator apertures are only partially opened, and so that the stator apertures are abruptly opened and closed, the time during which turbulence of the air passing through the stator apertures occurs because of expansion of the air past the sharp edge of the rotor and because of throttling is short. Consequently, the time is reduced during which dissipation of the energy of the air and the accompanying reduction of efficiency of the siren can occur. Furthermore, the time is reduced during which the stator apertures are not fully effective in producing sound waves of maximum intensity because of partial obstruction of the stator aperture by the rotor. This feature of the invention also adds substantially to the efficiency of the siren.

The combination of the individual horns for the stator apertures connected as indicated above, with stator and rotor apertures of the design indicated above, therefore reduces to a minimum the turbulence of the air passing through the stator apertures and into the horn, particularly the turbulence due to expansion of the air past abrupt edges as it passes through and leaves each stator aperture. Such combination itself makes possible a siren efficiency much greater than hitherto obtainable.

Other features of the illustrated embodiment also increased the efficiency of the siren, although not to as marked an extent as the features indicated above.

The air chamber 8 having the end wall 5 extending for a substantial distance beyond the stator apertures 6 and a volume which is large as compared with the volume of air passing through the stator apertures during any one period of opening substantially eliminates pulsations in the air in the chamber due to intermittent passage of the air through the stator apertures. Such pulsations would otherwise tend to cause turbulence in the air, and would also tend to generate in said chamber sound waves which would be ineffective for signaling purposes, both of which factors would dissipate a portion of the available energy of the air with a consequent reduction in efficiency.

In the illustrated embodiment, moreover, the introduction of the air into chamber 8 through duct 9 remote from the stator apertures, the increase in cross-sectional size of said chamber from the point of entry of the air to the stator apertures, and the partitions 27 in said stator chamber 8 all aid in providing a smooth, non-turbulent flow of air to the stator apertures and hence add to the efficiency of the siren.

The location of the stator apertures and rotor apertures in surfaces substantially perpendicular to the axis of rotation of the rotor is also important in making possible a smooth, straight, non-turbulent flow of air to the stator apertures, which adds to the efficiency of the siren. Moreover, such a design makes it possible to have all horns from the stator apertures extend in substantially the same direction, with a consequent advantageous directional effect, without the necessity of employing bent horns which would increase the impedance to the passage of the sound waves with a consequent reduction in efficiency. Moreover, the disposition of the rotor between the supply of air and the stator apertures, and the fact that the stator apertures are located on only one side of the rotor also aid in providing a straight, unobstructed, non-turbulent flow of air to the stator apertures.

The illustrated embodiment of the invention, therefore, provides a smooth, substantially straight flow of air to and through the stator apertures and horns associated with the stator apertures with a minimum of impedance to the flow of air and a minimum of turbulence in the air which could cause dissipation of the available energy of the air and a consequent reduction in efficiency.

In a siren of the above design and proportions in which the rotor was about 25 inches in diameter and was rotated at a speed of 4,500 revolutions per minute, and in which 2,500 cubic feet of air per minute were supplied at the relatively low pressure of 5 pounds per square inch above atmospheric pressure, a very high efficiency was obtained.

The present invention thus provides sirens of the type in which the signal is produced by expelling a driving fluid, such as air, under pressure through apertures in a stator which are alternately opened and closed by apertures in a rotating rotor which are of higher efficiency and are capable of a louder sound for a given type of sound and siren size than other sirens of the rotatable rotor type hitherto known.

Various modifications, some of which have been indicated above, may be made in the embodiment discussed above as illustrating the invention without departing from the spirit of the invention. For example, more or fewer stator and rotor apertures may be employed than are shown in the illustrated embodiment. Also, the feature that each stator aperture is provided with an individual acoustic horn constituting a continuation of the aperture, and/or the feature that the stator and rotor apertures are of such a design that the time during which each stator aperture is entirely opened and entirely closed is at least as great as the time during which it is only partially open, may be employed with considerable increases in efficiency in sirens in which the stator and rotor apertures are located in different positions or are differently shaped from those in the illustrated embodiment. Furthermore, the air supplied to the stator apertures may be supplied from different points or by different means than described above. Moreover, it is apparent that while the invention has been discussed in connection with the use of air as the driving fluid, other fluids may be employed in sirens embodying the invention and it is obvious that in the appended claims the definition of the driving fluid as air also includes other driving fluids.

It is intended that the patent shall cover, by suitable expression in the appended claims, whatever features of patentable novelty reside in the invention.

What is claimed is:

1. A siren comprising a stator having therethrough at least one unobstructed aperture through which air passes in the generation of sound waves; a rotatable rotor mounted at one side of said stator and having a portion, disposed in close proximity to said stator aperture and containing at least one rotor aperture, adapted to open and close said stator aperture during rotation of said rotor, said rotor aperture and said stator aperture being proportioned and said rotor aperture being disposed so that during rotation of said rotor at substantially uniform speed the time during which said stator aperture is entirely open and the time during which it is entirely closed each is at least about as long as the time during which said stator aperture is being opened and at least about as long as the time during which said stator aperture is being closed; and an acoustic horn at the side of said stator opposite the side at which said rotor is disposed communicating with said stator aperture by a throat of approximately the same shape and area as said stator aperture, whereby is provided a substantially smooth and unimpeded path for air through said stator aperture and horn.

2. A siren comprising a stator having therethrough at least one unobstructed aperture through which air passes in the generation of sound waves; a rotatable rotor mounted at one side of said stator and having a portion, disposed in close proximity to said stator aperture and containing at least one rotor aperture, adapted to open and close said stator aperture during rotation of said rotor, said rotor aperture and said stator aperture including substantially straight edges extending transversely of the direction of movement of said rotor relatively to said stator and cooperating to provide abrupt opening and closing of said stator aperture during rotation of said rotor, said rotor aperture and said stator aperture being proportioned and said rotor aperture being disposed so that during rotation of said rotor at substantially uniform speed the time during which said stator aperture is entirely open and the time during which it is entirely closed each is at least about as long as the time during which said stator aperture is being opened and at least about as long as the time during which said stator aperture is being closed; and an acoustic horn at the side of said stator opposite the side at which said rotor is disposed communicating with said stator aperture by a throat of approximately the same shape and area as said stator aperture, whereby is provided a substantially smooth and unimpeded path for air through said stator aperture and horn.

3. A siren comprising a stator having therethrough a plurality of unobstructed apertures through which air passes in the generation of sound waves; means for supplying air to each of said stator apertures; a rotatable rotor mounted at one side of said stator between said means for supplying air and said stator apertures having a portion, disposed in close proximity to said stator apertures and containing a plurality of rotor apertures, adapted to open and close said stator apertures during rotation of said rotor, each of said rotor apertures being at least about twice as wide in the direction of movement of said rotor relatively to said stator as each of said stator apertures and adjacent rotor apertures being spaced by a distance at least about twice the width of each of said stator apertures in the direction of movement of said rotor relatively to said stator; and, disposed at the side of said stator opposite the side at which said rotor is disposed, a plurality of acoustic horns, one for each of said stator apertures, each acoustic horn communicating with its stator aperture by a throat of substantially the same shape and area as said stator aperture, whereby is provided a substantially smooth and unimpeded path for air through said stator aperture and said horn.

4. A siren comprising a stator having therethrough a plurality of unobstructed apertures through which air passes in the generation of sound waves; means for supplying air to each of said stator apertures; a rotatable rotor mounted at one side of said stator between said means for supplying air and said stator apertures having a portion, disposed in close proximity to said stator apertures and containing a plurality of rotor apertures equal in number to said stator apertures, adapted to open and close said stator apertures during rotation of said rotor, each of said rotor apertures being about four times as wide in the direction of movement of said rotor relatively to said stator as each of said stator apertures and adjacent rotor apertures being spaced by a distance about four times the width of each of said stator apertures in the direction of movement of said rotor relatively to said stator; and, disposed at the side of said stator opposite the side at which said rotor is disposed, a plurality of acoustic horns, one for each of said stator apertures, each acoustic horn communicating with its stator aperture by a throat of substantially the same shape and area as said stator aperture and being free of substantial changes of direction between said throat and the mouth of said horn, whereby is provided a substantially smooth and unimpeded substantially straight path for air through said stator aperture and said horn.

5. A siren comprising a closed chamber forming the stator of said siren and having extending through a wall thereof at least one unobstructed stator aperture through which air passes in the generation of sound waves, the cross-sectional area of said chamber being large compared with the cross-sectional area of said aperture; means for supplying air to the interior of said chamber; a rotatable rotor mounted in said chamber having a portion, disposed in close proximity to said stator aperture and containing at least one rotor aperture, adapted to open and close said stator aperture during rotation of said rotor, said rotor aperture and said stator aperture being proportioned and said rotor aperture being disposed so that during rotation of said rotor at substantially uniform speed the time during which said stator aperture is entirely open and the time during which it is entirely closed each is at least about as long as the time during which said stator aperture is being opened and at least about as long as the time during which said stator aperture is being closed; and an acoustic horn outside of said chamber communicating with said stator aperture by a throat of approximately the same shape and area as said stator aperture, whereby is provided a substantially smooth and unimpeded path for air through said stator aperture and horn.

6. A siren comprising a closed chamber forming the stator of said siren and having extending through a wall thereof a plurality of unobstructed apertures through which air passes in the generation of sound waves, the cross-sectional area of said chamber being large compared with the total cross-sectional area of said stator apertures; means for supplying air to the interior of said chamber; a rotatable rotor mounted in said chamber having a portion, disposed in close proximity to said stator apertures and containing a plurality of rotor apertures, adapted to open and close said stator apertures during rotation of said rotor, each of said rotor apertures being at least twice as wide in the direction of movement of said rotor relatively to said stator as each of said stator apertures and adjacent rotor apertures being spaced by a distance at least twice as great as the width of each of said stator apertures in the direction of movement of said rotor relatively to said stator; and, disposed outside of said chamber, a plurality of acoustic horns, one for each of said stator apertures, each acoustic horn communicating with its stator aperture by a throat of substantially the same shape and area as said stator aperture, whereby is provided a substantially smooth and unimpeded path for air through said stator aperture and said horn.

7. A siren of the character described in claim 6 in which the rotor apertures and stator apertures have substantially straight edges extending transversely of the direction of movement of said rotor relatively to said stator and cooperating to provide abrupt opening and closing of said stator apertures during rotation of said rotor.

8. A siren comprising a stator having therethrough at least one unobstructed aperture through which air passes in the generation of sound waves; a rotatable rotor mounted at one side of said stator and having a portion, disposed in close proximity to said stator aperture and containing at least one rotor aperture, adapted to open and close said stator aperture during rotation of said rotor, said rotor aperture and said stator aperture being proportioned and said rotor aperture being disposed so that during rotation of said rotor at substantially uniform speed the time during which said stator aperture is entirely open and the time during which it is entirely closed each is about three times as long as the time during which said stator aperture is being opened and at least about three times as long as the time during which said stator aperture is being closed; and an acoustic horn at the side of said stator opposite the side at which said rotor is disposed communicating with said stator aperture by a throat of approximately the same shape and area as said stator aperture, whereby is provided a substantially smooth and unimpeded path for air through said stator aperture and said horn.

9. A siren comprising a rotatable rotor having a substantially radial portion containing at least one aperture; a stator having a wall extending transversely of the axis of rotation of said rotor containing at least one unobstructed aperture, through which air passes in the generation of sound waves, in close proximity to the portion of said rotor containing said rotor aperture and adapted to be opened and closed by said rotor aperture during rotation of said rotor, said rotor aperture and said stator aperture being proportioned and said rotor aperture being disposed so that during rotation of said rotor at substantially uniform speed the time during which said stator aperture is entirely open and the time during which it is entirely closed each is at least about as long as the time during which said stator aperture is being opened and at least about as long as the time during which said stator aperture is being closed; means for supplying air to said stator aperture from the side of said stator at which said rotor is disposed; and an acoustic horn at the side of said stator opposite the side at which said rotor is disposed communicating with said stator aperture by a throat of approximately the same shape and area as said stator aperture, whereby is provided a substantially smooth and unimpeded path for air through said stator aperture and horn.

10. A siren comprising a rotatable rotor having a substantially radial portion containing at least one aperture; a stator having a wall extending transversely of the axis of rotation of said rotor containing at least one unobstructed aperture, through which air passes in the generation of sound waves, in close proximity to the portion of said rotor containing said rotor aperture and adapted to be opened and closed by said rotor aperture during rotation of said rotor, said rotor aperture and said stator aperture including substantially straight edges extending transversely of the direction of movement of said rotor relatively to said stator and cooperating to provide abrupt opening and closing of said stator apertures during rotation of said rotor, said rotor aperture and said stator aperture being proportioned and said rotor aperture being disposed so that during rotation of said rotor at substantially uniform speed, the time during which said stator aperture is entirely open and the time during which it is entirely closed each is at least about as long as the time during which said stator aperture is being opened and at least about as long as the time during which said stator aperture is being closed; means for supplying air to said stator aperture from the side of said stator at which said rotor is disposed; and an acoustic horn at the side of said stator opposite the side at which said rotor is disposed communicating with said stator aperture by a throat of approximately the same shape and area as said stator aperture, whereby is provided a substantially smooth and unimpeded path for air through said stator aperture and horn.

11. A siren comprising a rotatable rotor having a substantially radial portion containing a plurality of apertures spaced around the axis of rotation of said rotor; a stator having a wall extending substantially radially of the axis of rotation of said rotor containing a plurality of unobstructed apertures, through which air passes in the generation of sound waves, spaced around the axis of rotation of said rotor in close proximity to the portion of said rotor containing said rotor apertures and adapted to be opened and closed by said rotor, each of said rotor apertures being at least twice as wide in the direction of movement of said rotor relatively to said stator as each of said stator apertures and adjacent rotor apertures being spaced by a distance at least twice as great as the width of each of said stator apertures in the direction of movement of said rotor relatively to said stator; and, disposed at and extending away from the side of said stator wall opposite the side at which said rotor is disposed, a plurality of acoustic horns, one for each of said stator apertures, each acoustic horn communicating with its stator aperture by a throat of substantially the same shape and area as said stator aperture, whereby is provided a substantially smooth and unimpeded path for air through said stator aperture and said horn.

12. A siren comprising a rotatable rotor having a substantially radial portion containing a plurality of apertures of equal width equally angularly shaped around the axis of rotation of said rotor; a stator having a wall extending substantially radially of the axis of rotation of said rotor containing a plurality of unobstructed apertures, through which air passes in the generation of sound waves, equal in number to the stator apertures, equal in width and equally angularly spaced about the axis of rotation of said rotor in close proximity to the portion of said rotor containing said rotor apertures and adapted to be opened and closed by said rotor apertures during rotation of said rotor, each of said rotor apertures being at least twice as wide in the direction of movement of said rotor relatively to said stator as each of said stator apertures and adjacent rotor apertures being spaced by a distance at least twice the width of each of said stator apertures in the direction of movement of said rotor relatively to said stator; and, disposed at the side of the stator wall opposite the side at which said rotor is disposed, a plurality of acoustic horns, one for each of said stator apertures, each acoustic horn communicating with its stator aperture by a throat of substantially the same shape and area as said stator aperture, whereby is provided a substantially smooth and unimpeded path for air through said stator aperture and said horn.

13. A siren comprising a rotatable rotor having a substantially radial portion containing a plurality of apertures spaced around the axis of rotation of said rotor; a closed chamber, enclosing said rotor, forming the stator of said siren and having a wall extending substantially radially of the axis of rotation of said rotor containing a plurality of unobstructed apertures spaced around the axis of rotation of said rotor in close proximity to the portions of said rotor containing said rotor apertures and adapted to be opened and closed by said rotor apertures during rotation of said rotor, each of said rotor apertures being at least twice as wide in the direction of movement of said rotor relatively to said stator as each of said stator apertures and adjacent rotor apertures being spaced by a distance at least twice the width of each of said stator apertures in the direction of movement of said rotor relatively to said stator; means for supplying air to the interior of said chamber; and disposed at and extending away from the side of said stator wall opposite the side at which said rotor is disposed, a plurality of acoustic horns, one for each of said stator apertures, each acoustic horn communicating with its stator aperture by a throat of substantially the same shape and area as said stator aperture, whereby is provided a substantially smooth and unimpeded path for air through said stator aperture and said horn.

14. A siren comprising a rotatable rotor having a substantially radial portion containing a plurality of apertures of equal width equally angularly spaced around the axis of rotation of said rotor; a closed chamber, enclosing said rotor, forming the stator of said siren and having a wall extending substantially radially of the axis of rotation of said rotor containing a plurality of unobstructed apertures, equal in number to the stator apertures, equal in width and equally angularly spaced about the axis of rotation of said rotor in close proximity to the portion of said rotor containing said rotor apertures and adapted to be opened and closed by said rotor apertures during rotation of said rotor, said rotor apertures and said stator apertures including substantially straight side edges extending substantially radially of the axis of rotation of said rotor which edges cooperate to provide abrupt opening and closing of said stator apertures during rotation of said rotor, each of said rotor apertures being at least about twice as wide in the direction of movement of said rotor relatively to said stator as each of said stator apertures and adjacent rotor apertures being spaced a distance at least twice the width of each of said stator apertures in the direction of movement of said rotor relatively to said stator; means for supplying air to the interior of said chamber; and, disposed at and extending away from the side of said stator wall opposite the side at which said rotor is disposed, a plurality of acoustic horns, one for each of said stator apertures, each acoustic horn communicating with its stator aperture by a throat of substantially the same shape and area as said stator aperture, whereby is provided a substantially smooth and unimpeded path for air through said stator aperture and said horn.

15. A siren of the character described in claim 14 in which each of the rotor apertures is about four times as wide as each of the stator apertures, and in which adjacent rotor apertures are spaced by a distance about four times the width of each of the stator apertures.

16. A siren comprising a rotatable rotor having a plurality of apertures equally angularly spaced around the axis of rotation of said rotor, a stator having a plurality of unobstructed apertures equally angularly spaced around the axis of rotation of said rotor located in close proximity to the portion of the rotor containing said rotor apertures and adapted to be opened and closed by said rotor apertures during rotation of said rotor, said rotor apertures and said stator apertures including substantially straight edges extending transversely of the direction of movement of said rotor with respect to said stator which edges cooperate to provide abrupt opening and closing of said stator apertures during rotation of said rotor, said rotor apertures being spaced by a distance at least about twice as wide as the width of each of said stator apertures and each of said rotor apertures being at least about twice as wide as the width of each of said stator apertures; and means for supplying air to said stator apertures.

17. A siren comprising a rotatable rotor having a radially flanged portion containing a plurality of apertures equally angularly spaced around the axis of rotation of said rotor; a closed chamber, enclosing said rotor, forming the stator of said siren and having a radially extending wall containing a plurality of equally angularly spaced unobstructed apertures in close proximity to the portion of said rotor containing said rotor apertures and adapted to be opened and closed by said rotor apertures during rotation of said rotor, said rotor apertures and said stator apertures including substantially straight side edges extending substantially radially of the axis of rotation of said rotor which edges cooperate to provide abrupt opening and closing of said stator apertures during rotation of said rotor, said rotor apertures being spaced by a distance at least about twice as wide as the width of each of said stator apertures and each of said rotor apertures being at least about twice as wide as the width of each of said stator apertures; means for supplying air to the interior of said stator chamber; and means for positively rotating said rotor.

18. A siren of the character described in claim 16 in which each of said rotor apertures is about four times as wide as each of said stator apertures and in which adjacent rotor apertures are spaced by a distance about four times the width of each of said stator apertures.

19. A siren of the character described in claim 17 in which each of said rotor apertures is about four times as wide as each of said stator apertures and in which adjacent rotor apertures are spaced by a distance about four times the width of each of said stator apertures.

ROBERT C. JONES.
EDWARD C. WENTE.
HORACE T. O'NEIL.